J. W. AYLSWORTH.
SOUND RECORD COMPOSITION.
APPLICATION FILED MAY 25, 1907.
944,474.
Patented Dec. 28, 1909.
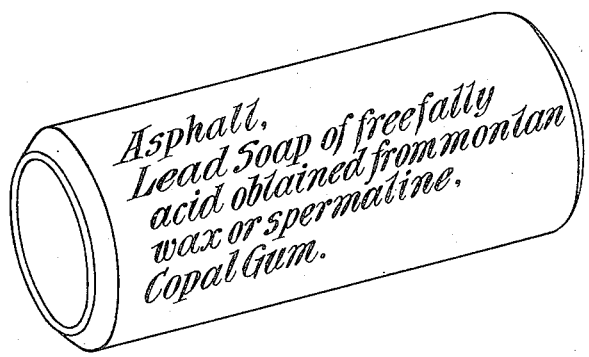
Witnesses:
Frank D Lewis
Herbert H Dyke
Inventor:
Jonas W. Aylsworth
by Frank L. Dyer
Atty.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

SOUND-RECORD COMPOSITION.

944,474.   Specification of Letters Patent.   Patented Dec. 28, 1909.

Application filed May 25, 1907. Serial No. 375,725.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Sound-Record Compositions, of which the following is a description.

In Letters Patent, No. 920,245, granted May 4th, 1909, Serial No. 342,317, I describe certain new and useful improvements in phonograph record compositions in which asphalt is admixed with a metallic stearate, such as stearate of lead, and preferably also with a resin gum such as copal gum, resulting in an excessively hard, tough, and durable material. My present invention is designed particularly as an improvement on this composition, but it may be used in connection with any composition in which stearic acid (in which expression is included its well known equivalent—palmitic acid) or metallic stearates are used. For instance, the improvements may be employed in connection with the manufacture of the well known composition which is now used for the production of talking machine blanks for making original or master records and consisting of stearates and palmitates of soda and alumina, together with an anti-hygroscopic ingredient, such as ceresin; or the improvement may be employed, for example, in the manufacture of compositions for making duplicate sound records, such as I describe in my Patent No. 782,375 of February 14th, 1905, in which carnauba wax is added to the blank material in such a way that the free alcohols of the wax will combine with the free stearic acid of the composition to form a hard wax-like compound ether, which gives to the composition many of its desirable properties; or instead, the improvements may be employed in connection with the special composition disclosed in Letters Patent No. 880,707, granted March 3, 1908, in which I disclose the employment of ebonite or montan wax, as available substitutes for the carnauba wax of the composition of my Patent No. 782,375.
Preferably, however, the improvements are designed for use in connection with compositions as disclosed in my patent first above referred to as I seek to produce a composition which shall be excessively hard and
tough, while at the same time having a smooth surface in order to make it practicable to make commercial records with a considerably finer pitch or record groove so as to increase the length of the reproduction. The invention is based on the discovery that a certain fatty acid, presently to be mentioned, may be substituted in these compositions for the stearic acid or palmitic acid and which results in the production of very much harder and more durable compositions than when stearic or palmitic acid is used. The fatty acid which I have discovered as an available material for use in this art is the fatty acid present in montan wax and which I shall refer to as montan acid. It may be used either alone or in combination with stearic or palmitic acid.

In my Patent No. 880,707 above referred to I refer to montan wax as being supplied in this country by the Strohmeyer & Arpe Company, at 64 Pearl street, New York city, as being a wax-like substance of a dark polished brown color, somewhat resembling discolored carnauba wax, and as being probably prepared from bituminous brown coal under the process disclosed in U. S. Patent No. 689,381 of December 24th, 1901. A highly refined form of montan wax is also sold in this country under the trade-name "Spermatine" and contains from 75 to 90% of a fatty acid of very high molecular weight, which I refer to as montan acid. In obtaining the montan acid from the montan wax or spermatine, I may combine the same with a base such as lead oxid or with an alkali such as soda or potash, or with an alkaline earth, such as lime, thereby forming a metallic soap with the free montan acid. The hydrocarbon ingredient remaining in the soap may be then removed by distillation with superheated steam at a temperature from 500 to 750° F. with or without vacuum; or the hydrocarbon may be extracted by a suitable solvent such as naphtha, petroleum-ether, or benzene, I consider it important to remove this hydrocarbon ingredient when the montan acid is to be used in connection with compositions in which asphalt is used, since its presence interferes with the miscibility of the asphalt. The soap thus formed and preferably with the hydrocarbon ingredient removed is now decomposed in any of the well known ways for recovering the free fatty acid therefrom. The montan acid thus obtained may be used in any of the compositions in which stearic acid is used with the important advantage that the compositions made therefrom are very much harder and very much more durable than when stearic acid is used.

It will be understood that in making the soap composition disclosed in my Patent No. 920,245 above referred to, in which stearate of lead is preferably used in combination with asphalt, the metallic soap originally formed with the free fatty acid of the montan wax or spermatine may be a lead soap; or, in other words, the spermatine or montan wax may be combined with lead oxid to form a lead soap with the free montan acid. After the hydrocarbon ingredient has been separated from this lead soap, the latter need not be decomposed for the recovery of the free fatty acid, but may be used directly as an ingredient in the composition in the same way as the stearate of lead. This of course is the desirable method of making this particular composition, as in this way the step of decomposing the soap and recovering the free fatty acid is dispensed with.

Attention is hereby directed to the accompanying drawing, forming part of this application, and illustrating a conventional record tablet having inscribed thereon the ingredients of a composition embodying my invention.

Having now described my invention, what I claim as new and desire to secure by Letters Patent is as follows:

1. A composition suitable for the manufacture of phonograph records which contains the fatty acid obtained from montan wax or spermatine, substantially as set forth.

2. As an ingredient for use in the make-up of sound record compositions, a metallic soap of the free fatty acid obtained from montan wax or spermatine, substantially as set forth.

3. As an ingredient for use in the make-up of sound record compositions, a lead soap of the free fatty acid obtained from montan wax or spermatine, substantially as set forth.

4. An improved composition for sound records, comprising a mixture of asphalt and a metallic soap of the free fatty acid obtained from montan wax or spermatine, substantially as set forth.

5. An improved composition for sound records, comprising a mixture of asphalt and a lead soap of the free fatty acid obtained from montan wax or spermatine, substantially as set forth.

6. An improved composition for sound records, comprising a mixture of asphalt, a metallic soap of the free fatty acid obtained from montan wax or spermatine and a resin gum, substantially as set forth.

7. An improved composition for sound records, comprising a mixture of asphalt, a lead soap of the free fatty acid obtained from montan wax or spermatine, and a resin gum, substantially as set forth.

8. An improved composition for sound records, comprising a mixture of asphalt, a metallic soap of the free fatty acid obtained from montan wax or spermatine, and copal gum, substantially as set forth.

9. An improved composition for sound records, comprising a mixture of asphalt, a lead soap of the free fatty acid obtained from montan wax or spermatine, and copal gum, substantially as set forth.

This specification signed and witnessed this 7th day of May 1907.

JONAS W. AYLSWORTH.

Witnesses:
FRANK L. DYER,
FRANK D. LEWIS.